US012756743B2

(12) United States Patent
Agrawal et al.

(10) Patent No.: US 12,756,743 B2
(45) Date of Patent: Oct. 6, 2026

(54) ELECTRONIC DEVICE WITH GROUP ACTION SHARING OF SECURITY FILTERING FOR THIRD-PARTY CONTENT

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 122 days.

(21) Appl. No.: 18/620,231

(22) Filed: Mar. 28, 2024

(65) Prior Publication Data

US 2025/0310378 A1 Oct. 2, 2025

(51) Int. Cl.
*H04L 9/40* (2022.01)

(52) U.S. Cl.
CPC .................................... *H04L 63/20* (2013.01)

(58) Field of Classification Search
CPC ....................................................... H04L 63/20
USPC ............................................................. 726/1
See application file for complete search history.

(56) References Cited

U.S. PATENT DOCUMENTS 9,009,827 B1 * 4/2015 Albertson ........... H04L 63/1441 726/22
2002/0042790 A1 * 4/2002 Nagahara .............. G06F 16/957 707/999.005
2014/0215551 A1 * 7/2014 Allain ................... H04L 63/104 726/1
2014/0282967 A1 * 9/2014 Maguire ........... H04W 52/0245 726/7
2015/0020151 A1 * 1/2015 Ramanathan ........... G06F 21/10 726/1
2015/0326614 A1 * 11/2015 Alperovitch ........... G06Q 10/40 726/1

* cited by examiner

*Primary Examiner* — Anthony D Brown
(74) *Attorney, Agent, or Firm* — Isidore PLLC

(57) ABSTRACT

An electronic device, method and computer program product mitigate risks of presenting content that may include links to malware or phishing queries at secondary device(s) by learning from security-related user actions taken at trusted primary device(s). In response to receiving, via user interface component(s), a user input designating third-party content as violating a security policy at an electronic device assigned group level authorization to make security decisions for security policy sharing group of electronic devices, the controller updates a security policy module of the electronic device. The controller configures the electronic device to implement the updated security policy of the third-party content. The controller transmits a security policy update to each second device within the security policy sharing group to trigger an update of the respective security policy module to recognize and locally implement security measures against similar third-party content that is subsequently received.

20 Claims, 8 Drawing Sheets

ELECTRONIC DEVICE WITH GROUP ACTION SHARING OF SECURITY FILTERING FOR THIRD-PARTY CONTENT

BACKGROUND

1. Technical Field

The present disclosure relates generally to electronic devices that presents contents with links to additional remote content, and more particularly, to electronic devices that filter presentation of received content with links to additional remote content to prevent activating malware links in the received content.

2. Description of the Related Art

Third-party content such as emails and text messages may present security risks by including links to malicious content or malware. Malware infiltrates devices through downloads, compromised websites, or unverified software, potentially compromising data or device functionality. One particular severe and disruptive type of malware is ransomware that encrypts device data until a ransom is paid. Similarly, third-party content may have the appearance of a communication from a well-known legitimate entity as a phishing attempt to obtain personal information. Automatic security filtering of received content is difficult to implement due to the evolving threat of new sources and appearance of malware and phishing. Frequently, automatic filtering will not recognize new content as a security violation. Users must discern suspicious messages, recognizing telltale signs like unfamiliar senders, unusual requests, or grammatical errors that may indicate malware. Vigilance against malware involves cautious browsing, avoiding untrusted websites, and verifying application sources before downloading. Users need to backup data regularly and avoid clicking on suspicious links or attachments to prevent such attacks. In addition to malware, phishing attempts use social engineering to exploit human psychology to manipulate users into divulging confidential information. Awareness and skepticism are crucial to identify and thwart such attempts. Not all users are sufficiently trained or capable of staying updated on security practices, given the evolving nature of threats.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
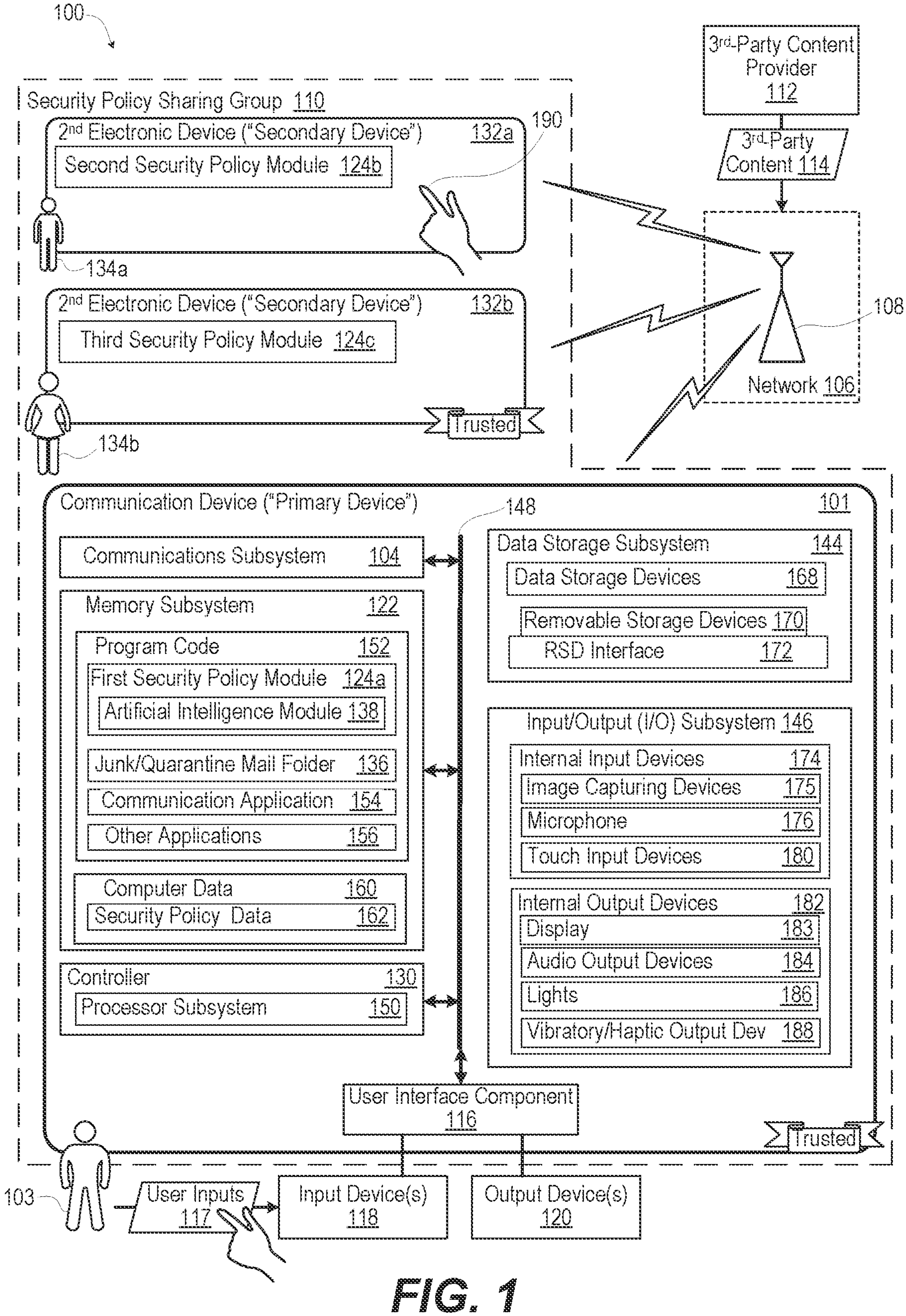
FIG. 1 presents a simplified functional block diagram of a communication device sharing security policy updates made by trusted device(s) of a security policy group, according to one or more embodiments.

According to aspects of the present disclosure, an electronic system, a method, and a computer program product provide more robust automatic security filtering of received content for suspicious links by creating/updating shared security policies based on user actions detected at trusted primary device(s) and automatically sharing the created/updated security policy with a group of linked secondary devices. Security vulnerabilities are mitigated at the linked secondary device(s) that may be used by less security aware users. In one or more embodiments, an electronic device includes at least one user interface component configured to receive user inputs via one or more input device and to present content via one or more output device. The electronic device includes a communications subsystem that communicatively couples the electronic device to at least one third-party content provider via a network. The communications subsystem also links the electronic device to one or more second electronic devices designated as part of a security policy sharing group, each device having a respective security policy module. The communication device has a memory including a security policy module that manages filtering of third-party content, in part based on received user-inputs that indicate when received third-party content violates a security policy of the electronic device or one or more of the second electronic devices. A controller of the communication device is communicatively coupled to the at least one user interface component, the communications subsystem, and the memory. The controller executes code of the security policy module, and the controller configures the electronic device to provide security policy sharing functionality. In response to receiving, via the at least one user interface component, a user input designating a first third-party content as violating a security policy, the controller identifies whether the electronic device has been assigned group level authorization to make security decisions for the security policy sharing group of electronic devices. In response to determining that the electronic device has been assigned group level authorization, the controller updates the security policy module of the electronic device. The controller configures the electronic device to implement the updated security policy of the first third-party content. The controller transmits a security policy update to each of the one or more second devices within the security policy sharing group to trigger an update of the respective security policy module to recognize and locally implement security measures against similar third-party content that is subsequently received.

In one or more embodiments, the present disclosure provides for artificial intelligence (AI) based security policy enforcement for a set of linked devices. In an electronic device associated with a first user, a controller determines availability of a collaborated space, such as Moto Family space, among the linked set of linked or connected devices belonging to at least one second user. Various features, including enhanced security, may be provided by collaborative interaction between connected devices. The controller determines which user accounts associated with the connected devices are appointed as a trusted account for learning purposes with regards to security policy. The controller detects user actions of the trusted account user on incoming messages and feeds the detected user actions into an AI-based machine learning system ("AI engine") that extracts patterns from the message and associates the action on the message to that pattern. In an example, the user action on the message is one of accepting or declining action. The user action may include an accepting action for an incoming message by the user clicking on a uniform resource locator (URL) in the message, forwarding the message, etc. In an additional example, the user action may include a declining action such as blocking the contact, reporting the contact, deleting the message without clicking on the URL, etc. The AI engine may scrape message content for patterns indicative of a security violation by detecting a language used, images, contact number, name, etc., that correlate to suspicious content. By utilizing similar human pattern recognition by a skilled user, the AI engine may be improved to automatically recognize additional instances of identical or similar suspicious content received at other linked devices, especially benefitting users who are less sophisticated in recognizing suspicious content. The AI engine recognizes patterns from user-based actions derived from the AI engine running on the primary account. The patterns are made available for secondary devices as updated security enforcement policy for the linked devices. The AI engine running on the second devices employs the updated security enforcement policy as learned from the trusted account device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic system that includes or is wholly provided by an electronic device, in which the features of the present disclosure are advantageously implemented for group action sharing of security filtering for third-party content. In one or more embodiments, the electronic device includes additional communications functionality as communication device 101 to operate as a mobile user device in communication environment 100. Communication device 101 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices.

In an example, communication device 101 is operated by user 103 who may have or may not have a trusted security expertise level. Communication device 101 includes communications subsystem 104 that enables communication device 101 to connect or link over network 106, which includes node 108, to other devices within security policy sharing group 110. Node 108 may represent a wireless access point, a cellular radio access network, a wired network interface, an over-the-air relay or repeater, or other communication link. Communication device 101 communicatively couples to at least one third-party content provider 112 via network 106 to receive third-party content 114. Communication device 101 includes at least one user interface component 116 configured to receive user inputs 117 (e.g., touch, gesture, sound) via one or more input device 118 and to present third-party content 114 via one or more output device 120.

To automatically mitigate risks that may be present in third-party content 114, communication device 101 includes memory subsystem 122 containing first security policy module 124*a* that manages filtering of third-party content 114. Controller 130 of communication device 101 is communicatively coupled to communications subsystem 104, at least one user interface component 116, and memory subsystem 122, and executes code of first security policy module 124*a*. Controller 130 configures communication device 101 to perform functionality described herein. Users with sufficient security expertise can improve the functionality of first, second and third security policy module 124*a*, 124*b* and 124*c*, respectively, at each of communication device 101 and second electronic devices 132*a*-132*b*. In an example, security policy sharing group 110 includes communication device 101 and at least one second electronic device 132*a*-132*b*, used respectively by second user 134*a*-134*b*. In an example, security policy sharing group 110 addressed varying levels of cybersecurity awareness among family members sharing a household. First security policy module 124*a* manages filtering of third-party content 114, in part based on received user-inputs, at a trusted device and/or from a trusted user, that indicates when received third-party content 114 violates a security policy. In other examples, security policy sharing group 110 may be established between co-workers, friends, members of a civic organization, professional acquaintances, or other groups that seek to benefit from having at least one trusted user.

Each user 103 and 134*a*-134*b* may have or may not have a trusted security expertise level. More security-savvy individuals can identify and counter online threats like phishing or malware, while less informed users fall victim to similar attacks. Living in proximity and sharing network access, their collective vulnerability amplifies as similar attacks affect all users. Aspects of the present disclosure recognize proactive measures taken by the knowledgeable user and autonomously distribute these proactive measures to shield and educate less aware users, thereby minimizing potential damages caused by cyber threats. A shared security framework automatically assists the less vigilant members at risk, reducing the overall susceptibility of the household (or other grouping) to repeated local attacks. In an example, user 103 and second user 134*b* have trusted security expertise level, which results in corresponding communication device 101 and second electronic device 132*b* being trusted devices designated as having a trusted security expertise level. Second user 134*a* does not have trusted security expertise level and thus corresponding second electronic device 132*a* is not a trusted device and is not designated as having a trusted security expertise level.

In one or more embodiments, in response to receiving, via at least one user interface component 116, a user input designating a first third-party content 114 as violating a security policy, controller 130 identifies whether communication device 101 has been assigned group level authorization to make security decisions for security policy sharing group 110 of electronic devices (101 and 132*a*-132*b*). In response to determining that user has been assigned group level authorization, controller 130 executes first security policy module 124*a* to configure communication device 101 to first update security policy module 124*a* of communication device 101. Controller 130 configures communication device 101 to implement the updated security policy on first third-party content 114. Controller 130 transmit a security policy update to each of the one or more second electronic devices 132*a*-132*b* within security policy sharing group 110 to trigger an update of the respective second and third security policy modules 124*b*-124*c* to recognize and locally implement security measures against similar third-party content 114 that is subsequently received.

In one or more embodiments, controller 130 identifies, from within security policy sharing group 110, at least one trusted device (e.g., communication device 101 and second electronic device 132*b*) that is designated as having a trusted security expertise level. Trusted security expertise level indicates that user inputs received at the at least one trusted device as related to potential security threats from third party content 114 can be utilized by first security policy module 124*a* to trigger updates to first security policy module 124*a* and respective second security policy modules 124*b*-124*c* of each device (101 and 132*a*-132*b*) within security policy sharing group 110. In response to receiving, via communications subsystem 104, information about a second input received at one of the one or more second devices (101 and 132*a*-132*b*) that is designated as a trusted device, identifying particular third-party content 114 as violating the security policy, controller 130 updates first security policy module 124*a*, based on the received information, and controller 130 configures communication device 101 to implement the updated security policy for subsequently received similar third-party content 114.

In one or more embodiments, controller 130 receives, via communications subsystem 104, third-party content 114 that is available for access on communication device 101. In response to receiving third-party content 114, controller 130 initiates a check for whether the user input has been received via at least one user interface component 116 designating third-party content 114 as violating a security policy. Controller 130 prevents an opening of third-party content 114 in response to having received the user input designating third-party content 114 as violating the security policy. In one or more particular embodiments, in response to determining that third-party content 114 is recognized as violating a security policy as updated by the user input, controller 130 presents, via user interface component 116, notification that third-party content 114 is not trusted for access on communication device 101 based on the updated security policy prompted by previously received user input. In one or more specific embodiments, controller 130 enables entry of an override of the security policy to allow opening of third-party content 114. In response to receiving, via user interface component 116 of communication device 101 while communication device 101 is designated as a trusted electronic device, an override input, presents third-party content 114 at the one or more output device. Accordingly, a user of a trusted device can modify a prior designation of received third party content as violating a security policy, if that user identifies the prior designation is not appropriate/correct for the particular content.

In one or more embodiments, controller 130 monitors for a local handling of third-party content 114, in response to not having received the user input. Controller 130 identifies if the local handling includes a second user input from among (i) designating third-party content 114 as violating the security policy, (ii) deleting third-party content 114 without opening the communication or a link within the communication, or (iii) moving third-party content 114 into a junk mail or quarantine mail folder 136. In response to detecting the second user input, controller 130 processes the second user input to determine whether to update first security policy module 124*a*. In response to updating security policy module 124*a*, controller 130 communicates the second user input to at least one other second electronic devices 132*a*-132*b*. In an example, the second user input is one or more user selection(s) to user interface controls (e.g., delete, move, flag, etc.) that affect presentation or storage of received content (i.e., "handling"). In another example, the user inputs are processed at the corresponding one other second electronic devices 132*a*-132*b* to infer an update to a security policy based on expert rules or pattern recognition by an AI module.

In an example, the AI model is trained to recognize third-party content 114 that violates a security policy. AI model training is the process by which AI models are trained to perform specific tasks or achieve certain objectives. It involves providing the model with a large amount of data and allowing it to learn from patterns and relationships within that data. Controller 130 may include various functionalities that enables controller 130 to perform different aspects of artificial intelligence (AI) modules. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output. In one or more embodiments, first security policy module 124*a* includes AI module 138 for computation tasks associated with security filtering of third-party content 114. In another example, controller 130 updates first security policy module 124*a* by further training AI module 138 to recognize similar third-party content 114 in response to identifying if local handling includes a user input from among (i) designating third-party content 114 as violating the security policy, (ii) deleting third-party content 114 without opening the communication or a link within the communication, or (iii) moving third-party content 114 into a junk mail or quarantine mail folder 136.

In one or more embodiments, controller 130 receives, via one of at least one user interface component 116, the user input designating third-party content 114 as violating the security policy. Controller 130 communicates the user input via communications subsystem 104 to one or more second electronic device 132*a*-132*b* to prompt an update of each security policy module 124*b* and 124*c* of one or more second electronic device 132*a*-132*b* to recognize third-party content 114, which is subsequently received, based on the user input. In one or more particular embodiments, controller 130 infers that third-party content 114 violates the security policy based on a local handling including a user input from among (i) designating third-party content 114 as violating the security policy, (ii) deleting third-party content 114 without opening the communication or a link within the communication, or (iii) moving third-party content 114 into junk mail or quarantine mail folder 136. In response to an inference based on the local handling, controller 130 updates first security policy module 124*a* to recognize and implement, based on the user input, security measures against similar third-party content 114 that is subsequently received in response to receiving confirming input via the at least one user input device.

In addition to communications subsystem 104, memory subsystem 122, and controller 130, communication device 101 may include data storage subsystem 144 and input/output (I/O) subsystem 146. To enable management by controller 130, system interlink 148 communicatively connects controller 130 with communications subsystem 104, memory subsystem 122, data storage subsystem 144 and I/O subsystem 146. System interlink 148 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 148) are illustrated in FIG. 1, it is to be understood that more, fewer, or different interconnections may be present in other embodiments.

Controller 130 includes processor subsystem 150, which includes one or more central processing units (CPUs) or data processors. Processor subsystem 150 can include one or more digital signal processors that can be integrated with data processor(s). Processor subsystem 150 can include other processors such as auxiliary processor(s) that may act as a low power consumption, always-on sensor hub for physical sensors. Controller 130 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 122 stores program code 152 for execution by processor subsystem 150 to provide the functionality described herein. Program code 152 includes applications such as communication application 154 that facilitates video communication session. Program code 152 may include first security policy module 124*a* and other applications 156. These applications/modules may be software or firmware that, when executed by controller 130, configures communication device 101 to provide functionality described herein. In an example, first security policy module 124*a* manages filtering of third-party content 114, in part based on received user-inputs that indicate when received third-party content violates a security policy of communication device 101 or one or more trusted devices, such as second electronic device 132*b*.

In one or more embodiments, several of the described aspects of the present disclosure are provided via executable program code of applications executed by controller 130. In one or more embodiments, program code 152 may be integrated into a distinct chipset or hardware module as firmware that operates separately from executable program code. Portions of program code 152 may be incorporated into different hardware components that operate in a distributed or collaborative manner. Memory subsystem 122 further includes operating system (OS), firmware interface, such as basic input/output system (BIOS) or Uniform Extensible Firmware Interface (UEFI), and firmware, which also includes and may thus be considered as program code 152.

Program code 152 may access, use, generate, modify, store, or communicate computer data 160, such as security policy data 162 that supports, and is updated by, first security policy module **124*a*. Computer data 160 may incorporate "data" that originated as raw, real-world "analog" information that consists of basic facts and figures. Computer data 160 includes different forms of data, such as numerical data, images, coding, notes, and financial data. Computer data 160 may originate at communication device 101 or be retrieved from a remote device via communications subsystem 104. Communication device 101 may store, modify, present, or transmit computer data 160 such as security policy data 162. Computer data 160 may be organized in one of a number of different data structures. Common examples of computer data 160 include video, graphics, text, and images. Computer data 160** can also be in other forms of flat files, databases, and other data structures.

Data storage subsystem 144 of communication device 101 includes data storage device(s) 168. Controller 130 is communicatively connected, via system interlink 148, to data storage device(s) 168. Data storage subsystem 144 provides program code 152 and computer data 160 stored on nonvolatile storage that is accessible by controller 130. For example, data storage subsystem 144 can provide a selection of program code 152 and computer data 160. These applications can be loaded into memory subsystem 122 for execution/processing by controller 130. In one or more embodiments, data storage device(s) 168 can include hard disk drives (HDDs), optical disk drives, and/or solid-state drives (SSDs), etc. Data storage subsystem 144 of communication device 101 can include removable storage device(s) (RSD(s)) 170, which is received in RSD interface 172. Controller 130 is communicatively connected to RSD 170, via system interlink 148 and RSD interface 172. In one or more embodiments, RSD 170 is a non-transitory computer program product or computer readable storage device that may be executed by a processor associated with a user device such as communication device 101. Controller 130 can access data storage device(s) 168 or RSD 170 to provision communication device 101 with program code 152 and computer data 160.

I/O subsystem 146 may include internal input devices 174 such as image capturing device(s) 175, microphone 176, and touch input devices 180 (e.g., screens, keys, or buttons). I/O subsystem 146 may include internal output devices 182 such as display 183, audio output devices 184, lights 186, and vibratory or haptic output devices 188.

In one or more embodiments, controller 130, via communications subsystem 104, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 104 includes a global positioning system (GPS) module that receives GPS broadcasts from GPS satellites to obtain geospatial location information. In one or more embodiments, controller 130, via communications subsystem 104, communicates via a wireless local area network (WLAN) link using one or more IEEE 802.11 WLAN protocols with an access point. In one or more embodiments, controller 130, via communications subsystem 104, may communicate via an OTA cellular connection with radio access networks (RANs). In an example, communication device 101, via communications subsystem 104, connects via RANs of a terrestrial network that is communicatively connected to a network server.

In one or more embodiments, communication device 101 responds to local user input(s) 117 detected by user interface component 116 designating first third-party content 114 as violating a security policy. In response to receiving, via at least one user interface component, user input 117 designating first third-party content 114 as violating a security policy, controller 130 identifies whether the electronic device (e.g., communication device 101) has been assigned group level authorization to make security decisions for security policy sharing group 110 of electronic devices. In response to determining that the electronic device (e.g., communication device 101) has been assigned group level authorization, controller 130 updates first security policy module **124*a* of communication device 101. Controller 130 configures communication device 101 to implement the updated security policy of the first third-party content. Controller 130 transmits a security policy update to each of the one or more second devices (e.g., second electronic devices 132*a*-132*b*) within the security policy sharing group 110 to trigger an update of the respective security policy module 124*a*-124*b* to recognize and locally implement security measures against similar third-party content 114** that is subsequently received.

Alternatively, or in addition to local user inputs 117, communication device 101 responds to remote user input(s) 190 shared by a remote trusted device (e.g., secondary electronic device **132*b*) of security policy sharing group 110 designating third-party content 114 as violating a security policy. In an example, controller 130 identifies, from within security policy sharing group 110, at least one trusted device (e.g., secondary electronic device 132*b*) that is designated as having a trusted security expertise level. Trusted security expertise level indicates that inputs received at the at least one trusted device as related to potential security threats from third party content can be utilized to trigger updates to the security policy module and respective security policy modules 124*a*-124*b* of each device (101, 132*a* and 132*b*) within security policy sharing group 110. Communication device 101 receives, via communications subsystem 104, information about second user input 190 received at one of the one or more second devices (e.g., secondary electronic device 132*b*) that is designated as a trusted device, identifying particular third-party content 114 as violating the security policy. In response to receiving the information, controller 130 updates first security policy module 124*a*, based on the received information. Controller 130 configures communication device 101** to implement the updated security policy for subsequently received similar third-party content.

In one or more embodiments, controller 130 receives, via communications subsystem 104, third-party content 114 that is available for access on communication device 101. In response to receiving third-party content 114, controller 130 initiates a check for whether user input 117 has been received via the at least one user interface component 116 designating third-party content 114 as violating a security policy. Controller 130 then prevents an opening of third-party content 130 in response to having received user input 117 designating third-party content 114 as violating the security policy. In one or more particular embodiments, in response to determining that third-party content is recognized as violating a security policy as updated by user input 117, controller presents, via user interface component 116, notification that third-party content 114 is not trusted for access on communication device based on the updated security policy prompted by previously received user input. In one or more specific embodiments, controller 130 enables entry of an override of the security policy to allow opening of third-party content 114. In response to receiving, via user interface component 116 of communication device 101 while communication device 101 is designated as a trusted electronic device, an override input, controller 130 presents third-party content 114 at one or more output device 120.

In one or more embodiments, controller 130 monitors for a local handling of the third-party content, in response to not having received the user input. Controller 130 identifies if the local handling includes a second user input from among (i) designating third-party content 114 as violating the security policy, (ii) deleting third-party content 114 without opening the communication or a link within the communication, or (iii) moving third-party content 114 into a junk mail or quarantine mail folder 136. In response to detecting the second user input, controller 130 processes the second user input to determine whether to update first security policy module 124*a*. In response to updating security policy module 124*a*, controller 130 communicates the second user input to at least one other second electronic devices 132*a*-132*b*.

In one or more embodiments, controller 130 receives, via one of at least one user interface component 116, user input 117 designating third-party content 114 as violating the security policy. Controller 130 communicates user input 117 (or a notification/data derived from user input 117) via communications subsystem 104 to one or more second electronic device 132*a*-132*b* to prompt an update of second and third security policy modules 124*a*-124*b* of second electronic device 132*a*-132*b* to recognize and block access to subsequently received similar third-party content 114, based on user input 117.

Figure 2:
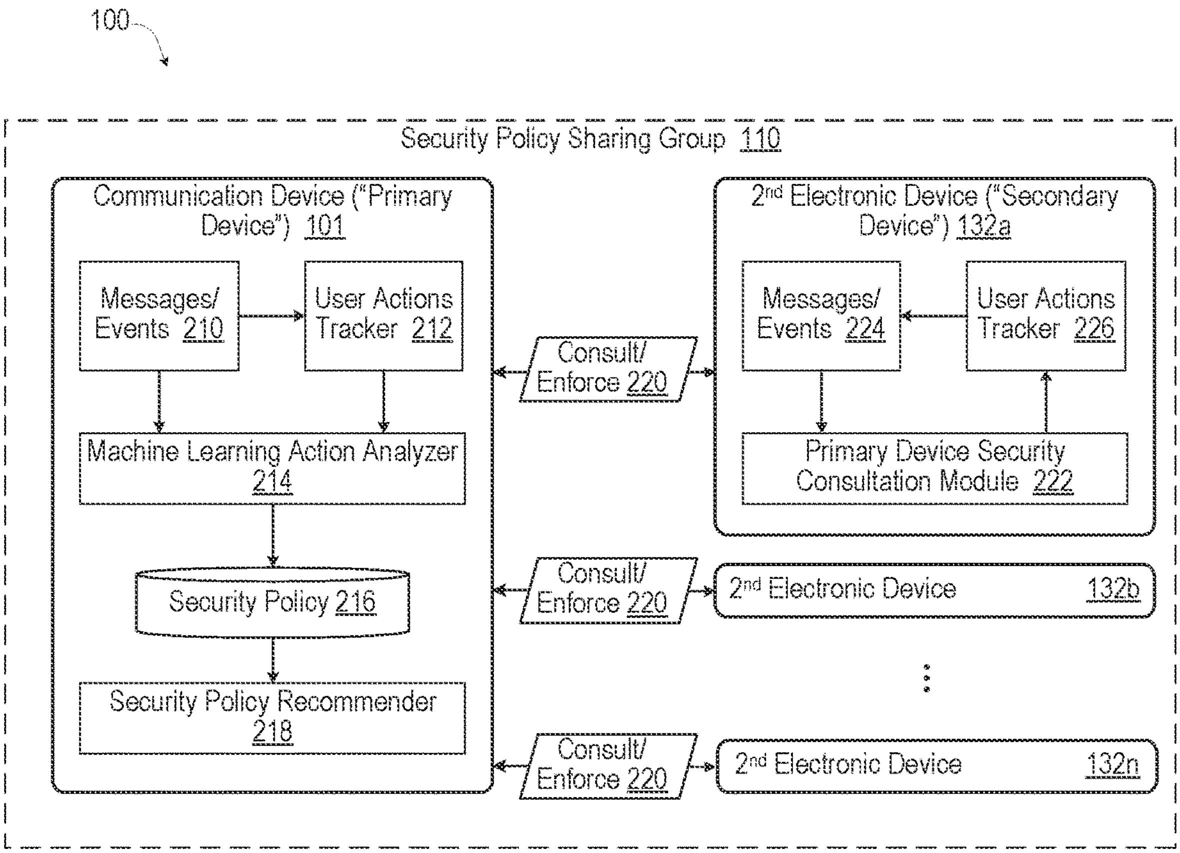
FIG. 2 is an example security policy update processing flow and communication flow between primary and secondary device(s) of a security policy sharing group, according to one or more embodiments.

FIG. 2 is an example security policy update processing flow and communication flow diagram between communication device 101 and secondary electronic device(s) 132*a*, 132*b*, . . . , and 132*n* of a security policy sharing group 110. Communication device 101 detects messages and events 210 that are processed by user actions tracker module 212 and provided to machine learning action analyzer 214. User action tracker module 212 is communicatively coupled to machine learning action analyzer 214 to identify changes to security policy database 216. The changes can create acceptance of third-party content or declining of third-party content. that security policy recommender module 218 shares a security policy update with electronic device(s) 132*a*, 132*b*, . . . , and 132*n* via consult/enforce messages 220. Secondary electronic device 132*a* is not a trusted device and depends on trusted devices, such as communication device 101, for changes in security policy received by primary device security consultation module 222. Messages/events 224 at secondary electronic device 132*a* that trigger security filtering are provided to primary device security consultation module 222. Primary device security consultation module 222 provides received enforcement user inputs from communication device 101 to user action tracker module 226. In an example, primary device security consultation module 222 provides raw user actions to secondary electronic device 132*a* for processing by user action tracker module 226 to determine an update to a security policy. In another example, primary device security consultation module 222 processes the raw user actions to create a security policy update. Then primary device security consultation module 222 provides the security policy to secondary electronic device 132*a* for implementation by user action tracker module 226.

Figure 3:
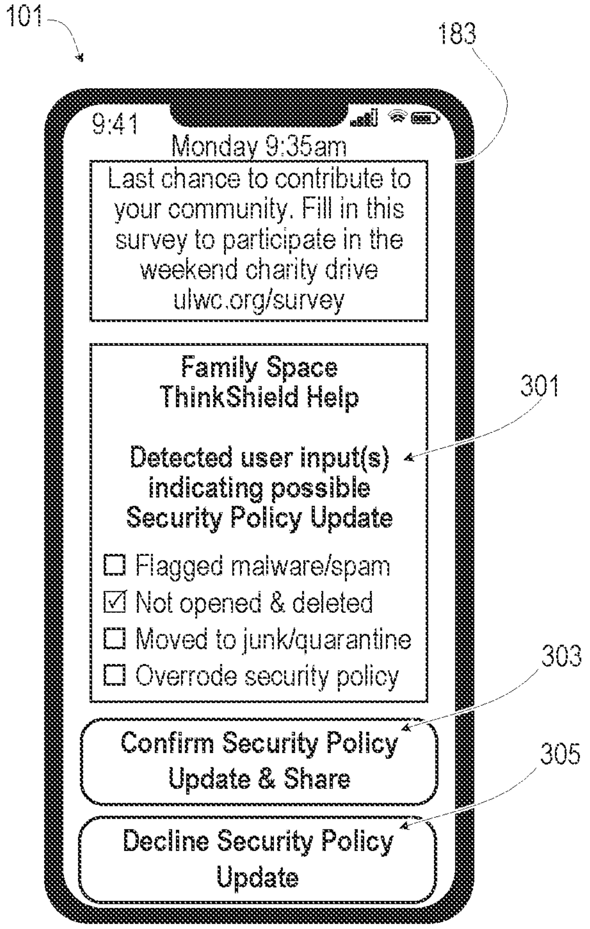
FIG. 3 presents an example user interface of an example communication device presenting a notification enabling confirmation that user inputs directed to presented third-party content indicates a security policy update, according to one or more embodiments.

FIG. 3 presents an example user interface presented on display 183 of example communication device 101. The user interface presents notification 301 that at least one local user input is inferred to be a change in security policy. In one or more embodiments, the inference may be automatically confirmed. Alternatively, and as depicted, the inference requires explicit user confirmation via notification 301 before being implemented as an update to the security policies. Notification 301 is accompanied by, or includes, accept control 303 whereby a user selection confirms the inference and prompts the update to the security policies. Notification 301 also is accompanied by, or includes, decline control 305 whereby the user selection overrides the inference and prevents the update to the security policies. In an example, a new security policy is inferred if a local handling includes a second user input from among (i) designating the third-party content as violating the security policy, (ii) deleting the third-party content without opening the communication or a link within the communication, or (iii) moving the third-party content into a junk mail or quarantine mail folder. In another example, an existing security policy is inferred to be deleted in response to a user input overriding an existing block on presenting third-party content.

Figure 4A:
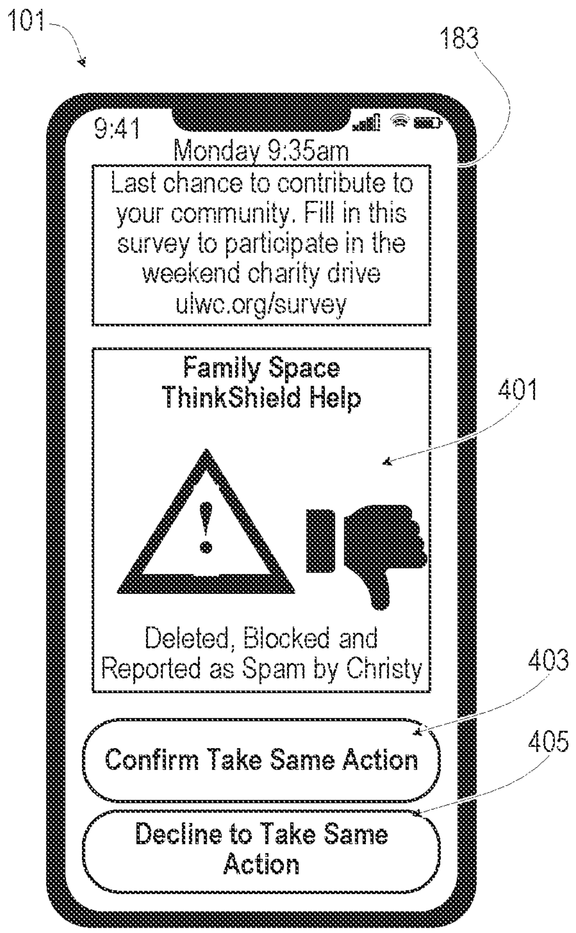
FIG. 4A presents an example user interface of an example communication device providing notification to enable taking of a similar action as a shared security policy update from a trusted device, according to one or more embodiments.

FIG. 4A presents an example user interface presented at display 183 of example communication device 101. The user interface presents notification 401 that at least one remote user input by a trusted user is applicable to received third-party-content. Notification 410 provides an opportunity for user confirmation or rejection for a shared security policy update. In particular, remote trusted user "Christy" has made a user input that blocks third-party content. A user of communication device 101 can implement the same blocking by selecting accept control 403. Alternatively, a user of communication device 101 can decline to implement the same blocking by selecting decline control 405.

Figure 4B:
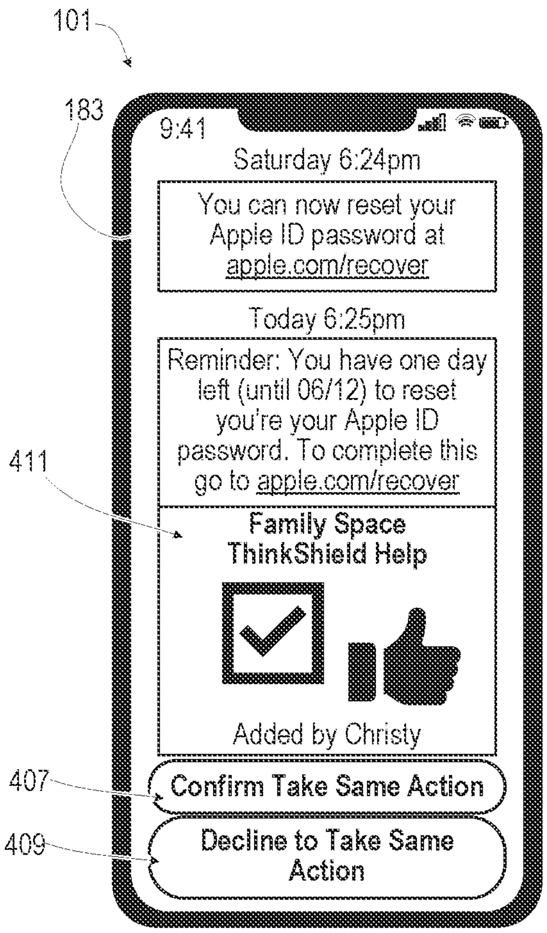
FIG. 4B presents a next example user interface of the example communication device providing notification of an action confirming acceptance of received third party content as verified with a shared security policy update from the trusted device, according to one or more embodiments.

FIG. 4B presents an example user interface presented at display 183 of example communication device 101. User interface 401 presents notification 411 that at least one remote trusted user input has triggered user confirmation or rejection respectively for a shared security policy update that is the converse scenario. In particular, remote trusted user "Christy" has made a user input that enable presenting third-party content that was previously blocked by a security policy. A user of communication device 101 can implement the same unblocking by selecting accept control 407. Alternatively, a user of communication device 101 can decline to implement the same unblocking by selecting decline control 409. In one or more embodiments, an "untrusted device", such as secondary electronic device 132*a* (FIG. 1) may implement security updates from trusted devices such as communication device 101 and secondary electronic device 132*b* without enabling or requiring confirmation by user 134*a* (FIG. 1).

Figure 5:
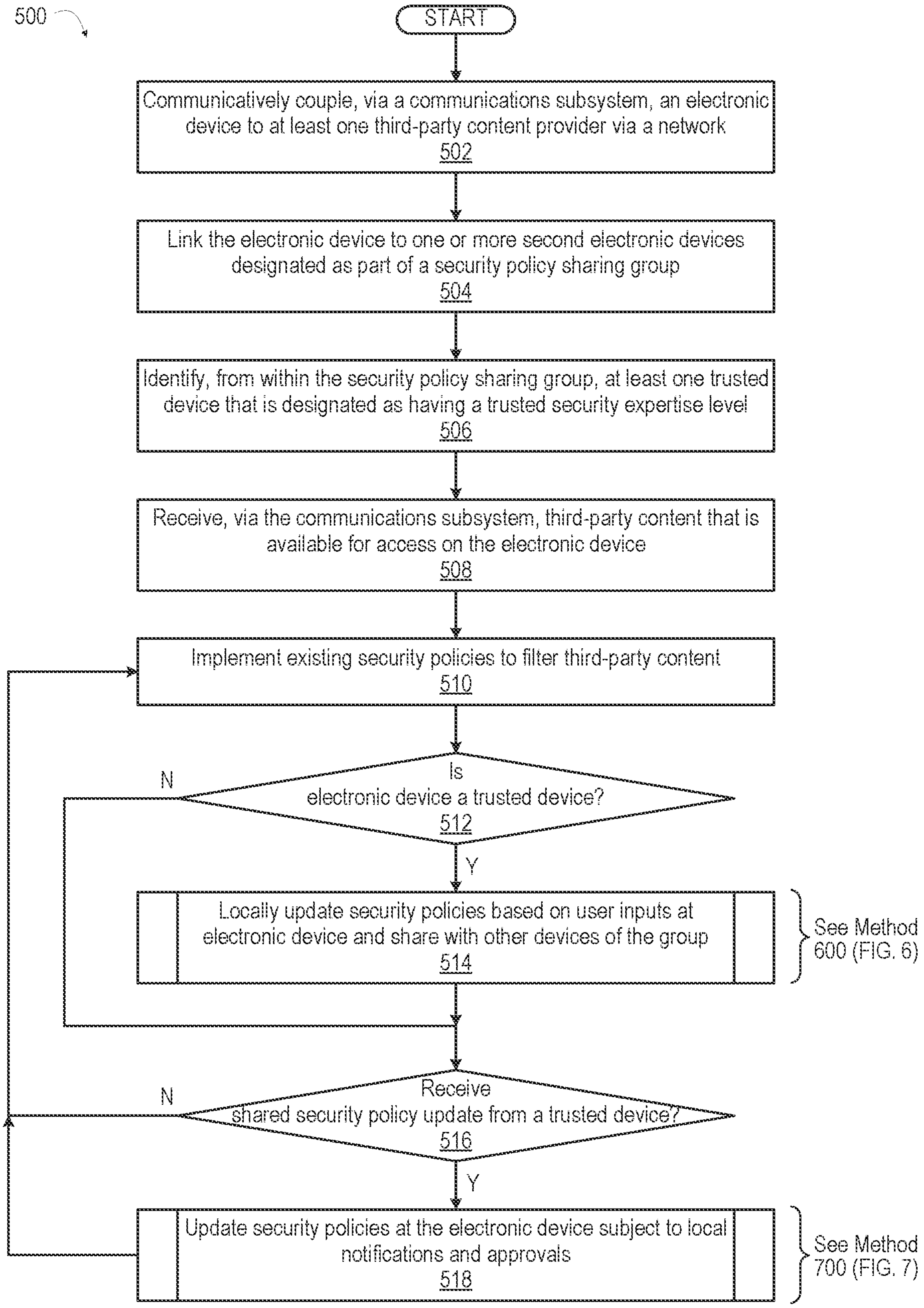
FIG. 5 is a flow diagram presenting a method of updating and making more robust automatic security filtering of received content for suspicious links by creating shared security policies, according to one or more embodiments.
Figure 6A:
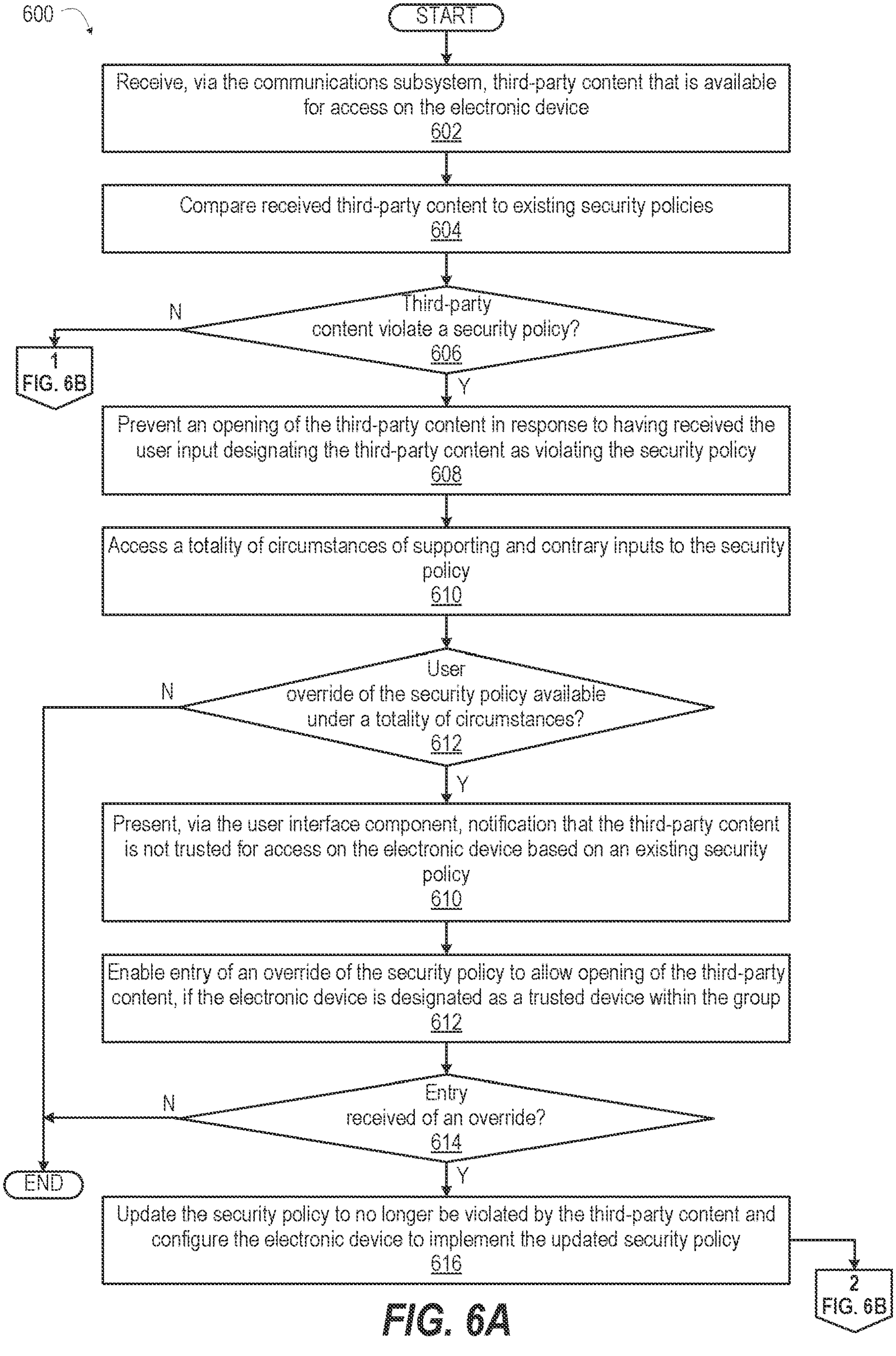
FIGS. 6A-6B (collectively "FIG. 6") are a flow diagram presenting a method of detecting user inputs at a trusted device that indicate an update to the security policies for implementing at the trusted device and for sharing with the group, according to one or more embodiments.
Figure 6B:
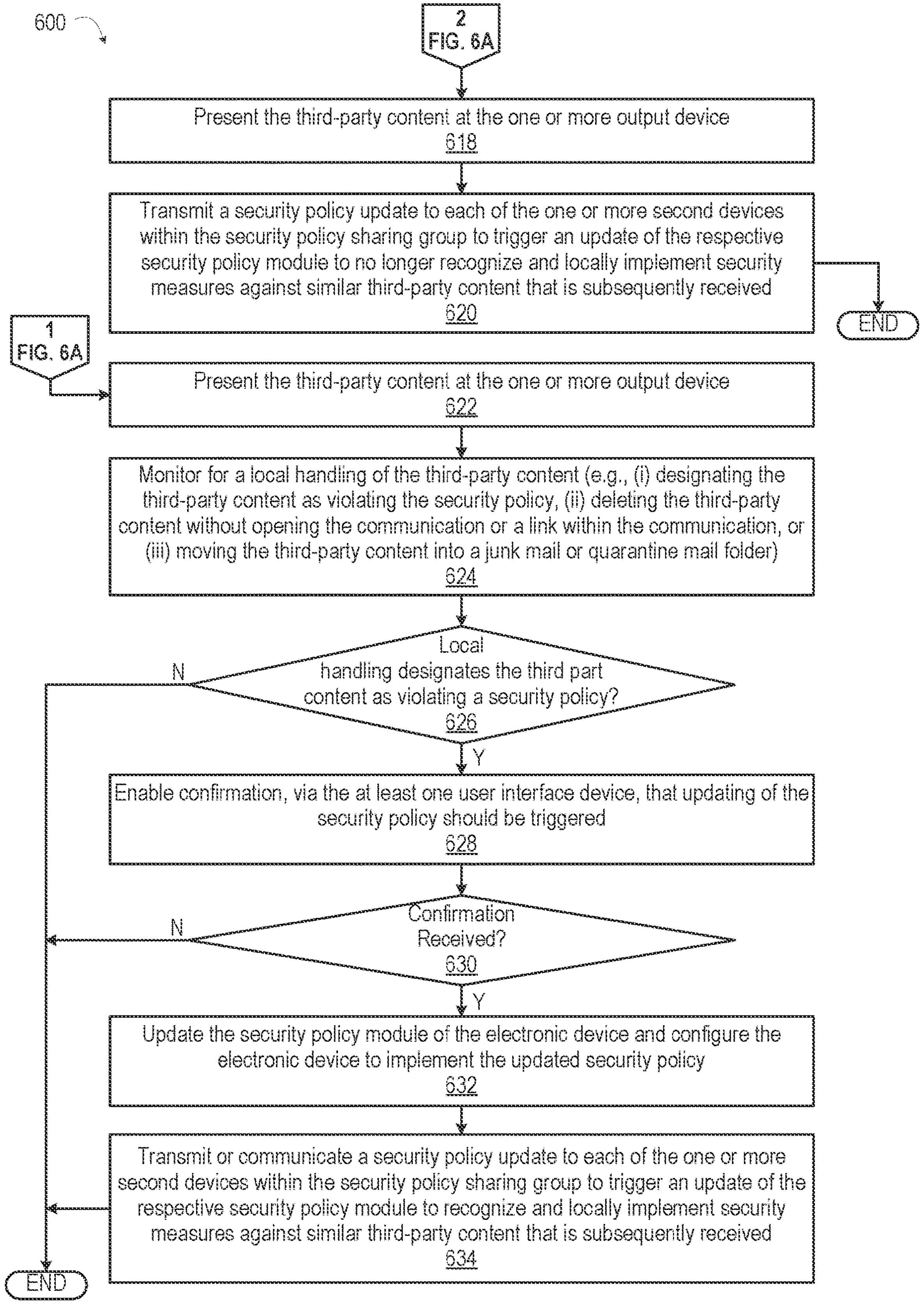
Figure 7:
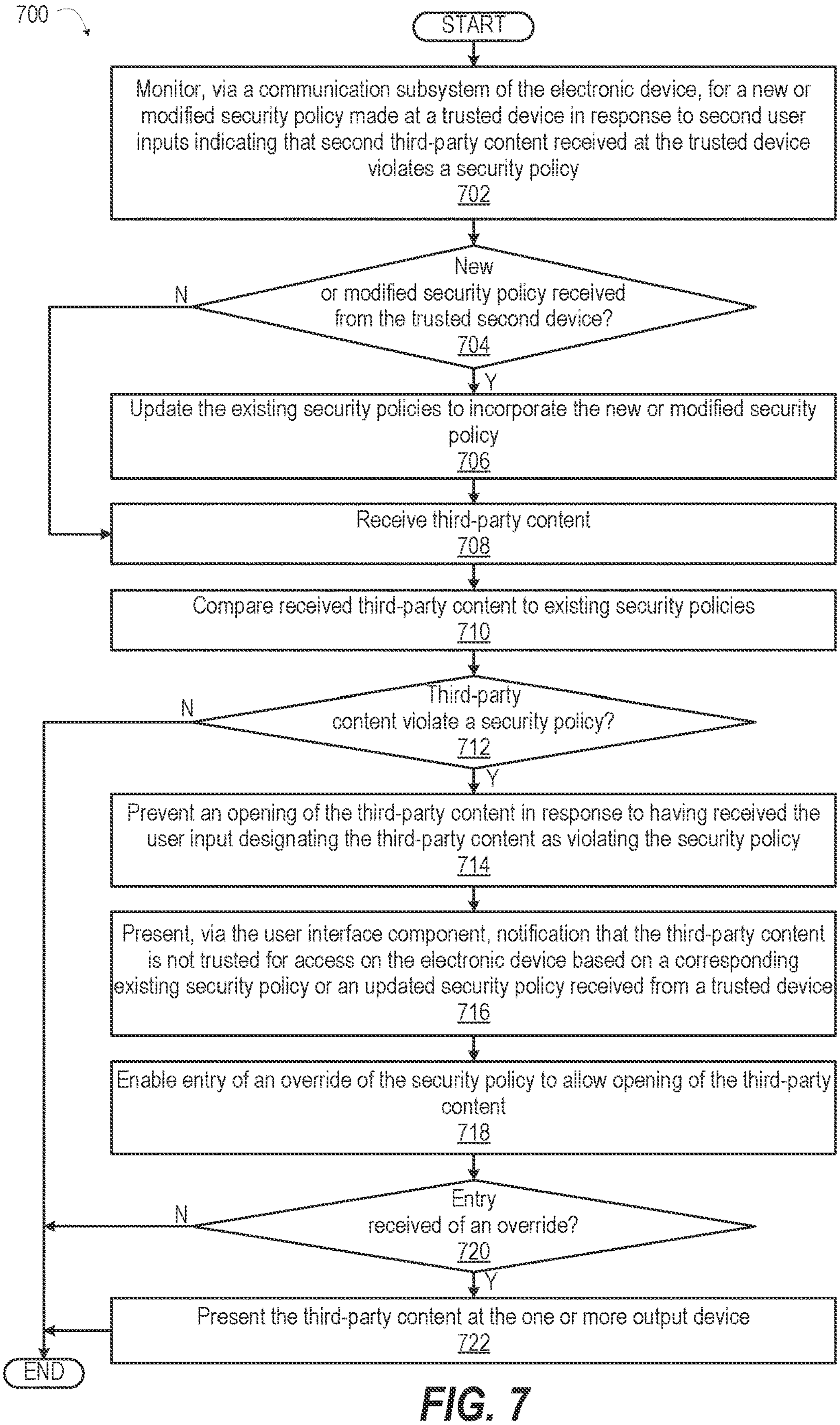
FIG. 7 is a flow diagram of a method of implementing an updated security policy that is received at a first device from a trusted device in the group, according to one or more embodiments.

FIG. 5 is a flow diagram presenting method 500 of updating and making more robust automatic security filtering of received content. The automatic security filtering is intended to mitigate malware and phishing attempts introduced via suspicious links included in the received content. Based on user actions detected at trusted primary device(s), updated security policies are generated and shared with a group of linked secondary devices. Security vulnerabilities are mitigated at the linked secondary device(s) that may be used by less security aware users. FIGS. 6A-6B (collectively "FIG. 6") are a flow diagram presenting method 600, augmenting method 500 (FIG. 5), of detecting user inputs at a trusted device that indicate an update to the security policies for implementing at the trusted device and for sharing with the group. FIG. 7 is a flow diagram of method 700, augmenting method 500 (FIG. 5), of implementing an updated security policy that is received from a trusted device in the group. The descriptions of method 500 (FIG. 5), method 600 (FIG. 6), and method 700 (FIG. 7) are provided with general reference to the specific components illustrated within the preceding FIGS. 1-3 and 4A-4B. Specific components referenced in 500 (FIG. 5), method 600 (FIG. 6), and method 700 (FIG. 7) may be identical or similar to components of the same name used in describing preceding FIGS. 1-3 and 4A-4B. In one or more embodiments, controller 130 (FIG. 1) configures communication device 101 (FIG. 1) or a similar computing device to provide the described functionality of 500 (FIG. 5), method 600 (FIG. 6), and method 700 (FIG. 7).

With reference to FIG. 5, method 500 includes communicatively coupling, via a communications subsystem, an electronic device to at least one third-party content provider via a network (block 502). Method 500 includes linking the electronic device to one or more second electronic devices designated as part of a security policy sharing group (block 504). Each device within the security policy sharing group has a respective security policy module that manages filtering of third-party content, in part based on received user-inputs that indicate when received third-party content violates a security policy of the electronic device or one or more of the second electronic devices. In one or more embodiments, the security policy module includes an artificial intelligence module trained to recognize third-party content that violates a security policy.

Method 500 includes identifying, from within the security policy sharing group, at least one trusted device that is designated as having a trusted security expertise level (block 506). Trusted security expertise level indicates that inputs received at the at least one trusted device as related to potential security threats from third party content, can be utilized to trigger updates to the security policy module and respective security policy modules of each device within the security policy sharing group. Method 500 includes receiving, via the communications subsystem, third-party content that is available for access on the electronic device (block 508). Method 500 includes implementing existing security policies to filter the third-party content (block 510). Method 500 includes determining whether the electronic device is a trusted device (decision block 512). In response to determining that the electronic device is a trusted device, method 500 includes locally update security policies based on user inputs at electronic device and share the user inputs or information corresponding to the user inputs with other devices of the group (block 514). An example of block 514 is provided as method 600 depicted in FIG. 6. In response to determining that the electronic device is not a trusted device in decision block 512 or after block 514, method 500 includes determining whether a shared security policy update is received from a trusted device of the group (decision block 516). In response to determining that a shared security policy update is received from a trusted device of the group, method 500 includes updating security policies at the electronic device, subject to local notifications and approvals (block 518). An example of block 518 is provided as method 700 depicted in FIG. 7. In response to determining that a shared security policy update is not received from a trusted device of the group in decision block 516 or after block 518, method 500 returns to block 510.

With reference to FIG. 6, method 600 includes receiving, via the communications subsystem, third-party content that is available for access on the electronic device (block 602). Method 600 includes comparing the received third-party content to existing security policies (block 604). Method 600 includes determining whether the third-party content violates a security policy (decision block 606). In response to determining that the third-party content does not violate a security policy, method 600 proceeds to block 626 (FIG. 6B). In response to determining that the third-party content violates a security policy, method 600 includes preventing an opening of the third-party content, which may be in response to having received the user input designating the third-party content as violating the security policy (block 608). In one or more embodiments, method 600 may include accessing a totality of circumstances of supporting inputs and contrary inputs to the security policy (block 610). For example, if there are two trusted users and a second trusted user twice determines the content is safe after an input (open, delete, ignore) from a first trusted user flags the content as potentially violating the security policy, the security policy is updated to reflect that the similar content is safe (as being twice verified). In another example, if each trusted user flags the content differently (safe versus unsafe), the second user is provided a notification that the first user who received similar content flagged the content differently and an opportunity is presented for the user to manually verify the setting for use by the group. Further, in one embodiment, a communication chat or dialog may be opened for the trusted users to collaborate on a final security setting for the particular content. In another example, the security policy may be wholly based on not whether or not the origin domain or links in the third-party content is explicitly called out in one of a safe list and an unsafe list. Those domains or links not found within one of the lists are deemed suspicious as a default. A trusted user may override this default security policy and prompt sharing to other devices. Third-party content explicitly found in the unsafe list may not be overridden by a trusted user. An enterprise administrator may be required to remove such suspicious links from the unsafe list. In another example, other users, either trusted or untrusted, may have conflicting actions with regard to the third-party content. Method 600 may further include determining whether user override of the security policy is available under a totality of circumstances (block 612). In response to determining that user override of the security policy is not available under a totality of circumstances, method 600 ends. In response to determining that user override of the security policy is available under a totality of circumstances, method 600 includes presenting, via the user interface component, notification that the third-party content is not trusted for access on the electronic device based on an existing security policy or based on an updated security policy prompted by previously received user input at a trusted device (block 614). Method 600 includes enabling entry of an override of the security policy to allow opening of the third-party content, if the electronic device is designated as a trusted device within the group (block 616). Method 600 proceeds to block 618 (FIG. 6B).

With reference to FIG. 6B, method 600 includes determining whether entry is received of an override of the security policy to allow opening of the third-party content (decision block 618). In response to determining that no entry is received of an override of the security policy to allow opening of the third-party content, method 600 ends. In response to determining that entry is received of an override of the security policy to allow opening of the third-party content, method 600 includes updating the security policy to no longer be violated by the third-party content (block 620). In an example, the security policy may be automatically triggered based on a link not being listed in a safe domain list, and thus deemed as suspicious. The user may recognize the link as a safe domain and thus override the automatic filtering. Method 600 includes presenting the third-party content at the one or more output device (block 622). Method 600 includes transmitting a security policy update to each of the one or more second devices within the security policy sharing group to trigger an update of the respective security policy module to no longer recognize and locally implement security measures against similar third-party content that is subsequently received (block 624). Other devices can benefit from evaluation (as safe or unsafe) by a trusted user of links that are unknown by the existing security policies.

With reference to FIG. 6B, in response to determining that the third-party content does not violate a current/existing security policy in decision block 606 (FIG. 6A), method 600 includes presenting the third-party content at the one or more output device (block 622). Method 500 includes monitoring for a local handling of the third-party content (e.g., (i) designating the third-party content as violating the security policy, (ii) deleting the third-party content without opening the communication or a link within the communication, or (iii) moving the third-party content into a junk mail or quarantine mail folder) (block 624). Method 600 includes determining whether local handling by the user indicates or designates the third part content as violating a security policy (decision block 626). In response to determining that local handling local handling does not designate the third part content as violating a security policy, method 600 ends. In response to determining that local handling local handling designates the third part content as violating a security policy, as determined by the user, method 600 includes enabling confirmation, via the at least one user interface device, that updating of the security policy should be triggered (block 628). In one or more alternate embodiments, method 600 does not require confirmation to implement a security update, which is automatically completed. Method 600 includes determining whether confirmation is received (decision block 630). In response to not receiving, via the at least one user interface component, a user input confirming the update to the security policy, method 600 ends. In response to receiving, via the at least one user interface component, a user input confirming the update to the security policy, method 600 includes updating the security policy module of the electronic device and configuring the electronic device to implement the updated security policy on the first third-party content (block 632). In one or more embodiments, method 600 may further include updating the security policy module by further training the artificial intelligence module to recognize similar third-party content in response to identifying if local handling comprises a user input from among (i) designating the third-party content as violating the security policy, (ii) deleting the third-party content without opening the communication or a link within the communication, or (iii) moving the third-party content into a junk mail or quarantine mail folder. Method 600 includes transmitting or communicating a security policy update to each of the one or more second devices within the security policy sharing group to trigger an update of the respective security policy module to recognize and locally implement security measures against similar third-party content that is subsequently received (block 634). Then method 600 ends.

With reference to FIG. 7, method 700 includes monitoring, via the communication subsystem from a trusted second device, for information of an updated security policy or second user inputs indicating that the second third-party content violates a security policy (block 702). Examples of second user inputs may include: (i) designating the third-party content as violating the security policy, (ii) deleting the third-party content without opening the communication or a link within the communication, or (iii) moving the third-party content into a junk mail or quarantine mail folder. Method 700 includes determining whether a new or modified security policy is received from the trusted second device (decision block 704). In response to determining that new or modified security policy is received from the trusted second device, method 700 includes updating the existing security policies to incorporate the new or modified security policy (block 706). Method 700 includes receiving third-party content (block 708). Method 700 includes comparing received third-party content to the updated security policies (block 710). Method 700 includes determining whether the third-party content violates a security policy within the updated security policies (block 712). In response to determining that the third-party content does not violate a security policy, method 700 ends. In response to determining that the third-party content does violate a security policy, method 700 includes preventing an opening of the third-party content, which effectively occurs in response to having received the user input designating the third-party content as violating the security policy (block 714). Method 700 includes presenting, via the user interface component, notification that the third-party content is not trusted for access on the electronic device based on a corresponding existing security policy or an updated security policy received from a trusted device (block 716). Method 700 includes enabling entry of an override of the security policy to allow opening of the third-party content (block 718). Method 700 includes determining whether entry is received of an override (decision block 720). In response to determining that an entry is not received of an override, method 700 ends. In response to determining that an entry is received of an override, method 700 includes presenting the third-party content at the one or more output device (block 722). Then method 700 ends.

In one or more embodiments, method 700 may further include identifying, from within the security policy sharing group, at least one trusted device that is designated as having a trusted security expertise level, which indicates that inputs received at the at least one trusted device as related to potential security threats from third party content, can be utilized to trigger updates to the security policy module and respective security policy modules of each device within the security policy sharing group. In response to receiving, via the communications subsystem, information about a second input received at one of the one or more second devices that is designated as a trusted device, identifying particular third-party content as violating the security policy, the method 700 may further include updating the local security policy module, based on the received information, and configuring the electronic device to implement the updated security policy for subsequently received similar third-party content.

In one or more embodiments, method 700 may further include receiving, via the communications subsystem, third-party content that is available for access on the electronic device. In response to receiving the third-party content, method 700 may further include initiating a check for whether the user input has been received via the at least one user interface device designating the third-party content as violating a security policy. Method 700 may further include preventing an opening of the third-party content in response to having received the user input designating the third-party content as violating the security policy.

In one or more particular embodiments, in response to determining that the third-party content is recognized as violating a security policy as updated by the user input, method 700 may further include presenting, via the user interface component, notification that the third-party content is not trusted for access on the electronic device based on the updated security policy prompted by previously received user input.

In one or more specific embodiments, method 700 may further include enabling entry of an override of the security policy to allow opening of the third-party content. In response to receiving, via the user interface device of the electronic device while the electronic device is designated as a trusted electronic device, an override input, method 700 may further include presenting the third-party content at the one or more output device.

In one or more embodiments, method 700 may further include monitoring for a local handling of the third-party content, in response to not having received the user input. Method 700 may further include identifying if the local handling comprises a second user input from among (i) designating the third-party content as violating the security policy, (ii) deleting the third-party content without opening the communication or a link within the communication, or (iii) moving the third-party content into a junk mail or quarantine mail folder. In response to detecting the second user input, method 700 may further include processing the second user input to determine whether to update the security policy module. In response to updating the security policy module, method 700 may further include communicating the second user input to at least one other second electronic devices.

In one or more embodiments, the security policy module includes an artificial intelligence module trained to recognize third-party content that violates a security policy. Method 700 may further include updating the security policy module by further training the artificial intelligence module to recognize similar third-party content in response to identifying if local handling comprises a user input from among (i) designating the third-party content as violating the security policy, (ii) deleting the third-party content without opening the communication or a link within the communication, or (iii) moving the third-party content into a junk mail or quarantine mail folder.

In one or more embodiments, method 700 may further include receiving, via one of the at least one user interface component, the user input designating the third-party content as violating the security policy. Method 700 may further include communicating the user input via the communications subsystem to the one or more second electronic device to prompt an update of each security policy module of the one or more second electronic device to recognize third-party content, which is subsequently received, based on the user input.

In one or more particular embodiments, method 700 may further include inferring that the third-party content violates the security policy based on a local handling that includes a user input from among (i) designating the third-party content as violating the security policy, (ii) deleting the third-party content without opening the communication or a link within the communication, or (iii) moving the third-party content into a junk mail or quarantine mail folder. In response to inferring a security policy violation based on the local handling, method 700 may further include presenting a notification to confirm an inferred update of security policy. Method 700 may further include updating the security policy module to recognize and implement, based on the user input and/or in response to receiving confirming input via the at least one user input device, security measures against similar third-party content that is subsequently received.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

at least one user interface component configured to receive user inputs via one or more input device and to present content via one or more output device;

a communications subsystem that communicatively couples the electronic device to at least one third-party content provider via a network and that links the electronic device to one or more second electronic devices designated as part of a security policy sharing group, each device having a respective security policy module;

a memory comprising a security policy module that manages filtering of third-party content, in part based on received user-inputs that indicate when received third-party content violates a security policy of the electronic device or one or more of the second electronic devices; and a controller communicatively coupled to the at least one user interface component, the communications subsystem, and the memory, and which executes code of the security policy module, which configures the electronic device to:

in response to receiving, via the at least one user interface component, a user input designating a first third-party content as violating a security policy:

identify whether the electronic device has been assigned group level authorization to make security decisions for the security policy sharing group of electronic devices comprising the electronic device and the one or more second electronic devices; and in response to determining that the electronic device has been assigned group level authorization to make security decisions for the security policy sharing group of electronic devices:

update the security policy module of the electronic device;

configure the electronic device to implement the updated security policy of the first third-party content; and transmit a security policy update to each of the one or more second devices within the security policy sharing group to trigger an update of the respective security policy module of each of the one or more second devices to cause the one or more second devices to recognize and locally implement security measures against similar third-party content that is subsequently received at a respective one of the one or more second devices, wherein the security policy update is transmitted only if the electronic device has been assigned group level authorization or is designated as a trusted device within the security policy sharing group.

2. The electronic device of claim 1, wherein the controller:

identifies, from within the security policy sharing group, at least one trusted device that is designated as having a trusted security expertise level, which indicates that inputs received at the at least one trusted device as related to potential security threats from third party content, can be utilized to trigger updates to the security policy module and respective security policy modules of each device within the security policy sharing group; and in response to receiving, via the communications subsystem, information about a second input received at one of the one or more second devices that is designated as a trusted device, identifying particular third-party content as violating the security policy:

updates the local security policy module, based on the received information; and configures the electronic device to implement the updated security policy for subsequently received similar third-party content;

wherein the electronic device updates the local security policy module and configures the electronic device only when the information is received from a second device that has been assigned group level authorization or designated as a trusted device among the one or more second devices.

3. The electronic device of claim 1, wherein the controller:

receives, via the communications subsystem, third-party content that is available for access on the electronic device; and in response to receiving the third-party content:

initiates a check for whether the user input has been received via the at least one user interface device designating the third-party content as violating a security policy; and prevents an opening of the third-party content in response to having received the user input designating the third-party content as violating the security policy.

4. The electronic device of claim 3, wherein the controller further:

in response to determining that the third-party content is recognized as violating a security policy as updated by the user input, presents, via the user interface component, notification that the third-party content is not trusted for access on the electronic device based on the updated security policy prompted by previously received user input.

5. The electronic device of claim 3, wherein the controller:

enables entry of an override of the security policy to allow opening of the third-party content; and in response to receiving, via the user interface device of the electronic device while the electronic device is designated as a trusted electronic device, an override input, presents the third-party content at the one or more output device.

6. The electronic device of claim 1, wherein the controller:

monitors for a local handling of the third-party content, in response to not having received the user input;

identifies if the local handling comprises a second user input from among (i) designating the third-party content as violating the security policy, (ii) deleting the third-party content without opening the communication or a link within the communication, or (iii) moving the third-party content into a junk mail or quarantine mail folder; and in response to detecting the second user input:

processes the second user input to determine whether to update the security policy module; and in response to updating the security policy module, communicates the second user input to at least one other second electronic device.

7. The electronic device of claim 1, wherein:

the security policy module comprises an artificial intelligence module trained to recognize third-party content that violates a security policy; and the controller updates the security policy module by further training the artificial intelligence module to recognize similar third-party content in response to identifying if local handling comprises a user input from among (i) designating the third-party content as violating the security policy, (ii) deleting the third-party content without opening the communication or a link within the communication, or (iii) moving the third-party content into a junk mail or quarantine mail folder.

8. The electronic device of claim 1, wherein the controller:

receives, via one of the at least one user interface component, the user input designating the third-party content as violating the security policy; and communicates the user input via the communications subsystem to the one or more second electronic device to prompt an update of each security policy module of the one or more second electronic device to recognize third-party content, which is subsequently received, based on the user input.

9. The electronic device of claim 8, wherein the controller:

infers that the third-party content violates the security policy based on a local handling comprising a user input from among (i) designating the third-party content as violating the security policy, (ii) deleting the third-party content without opening the communication or a link within the communication, or (iii) moving the third-party content into a junk mail or quarantine mail folder; and in response to an inference based on the local handling:

presents a notification to confirm an inferred update of security policy; and updates the security policy module to recognize and implement, based on the user input, security measures against similar third-party content that is subsequently received in response to receiving confirming input via the at least one user input device.

10. A method comprising:

communicatively coupling, via a communications subsystem, an electronic device to at least one third-party content provider via a network;

linking the electronic device to one or more second electronic devices designated as part of a security policy sharing group, each device having a respective security policy module that manages filtering of third-party content, in part based on received user-inputs that indicate when received third-party content violates a security policy of the electronic device or one or more of the second electronic devices;

receiving user inputs via one or more input device of at least one user interface component;

presenting content via one or more output device of the at least one user interface component; and in response to receiving, via the at least one user interface component, a user input designating a first third-party content as violating a security policy:

identifying whether the electronic device has been assigned group level authorization to make security decisions for security policy sharing group of electronic devices comprising the electronic device and the one or more second electronic devices; and in response to determining that the electronic device has been assigned group level authorization to make security decisions for the security policy sharing group of electronic devices:

updating the security policy module of the electronic device;

configuring the electronic device to implement the updated security policy of the first third-party content; and transmitting a security policy update to each of the one or more second devices within the security policy sharing group to trigger an update of the respective security policy module of each of the one or more second devices to cause the one or more second device to recognize and locally implement security measures against similar third-party content that is subsequently received at a respective one of the one or more second devices, wherein the security policy update is transmitted only if the electronic device has been assigned group level authorization or is designated as a trusted device within the security policy sharing group.

11. The method of claim 10, further comprising:

identifying, from within the security policy sharing group, at least one trusted device that is designated as having a trusted security expertise level, which indicates that inputs received at the at least one trusted device as related to potential security threats from third party content, can be utilized to trigger updates to the security policy module and respective security policy modules of each device within the security policy sharing group; and in response to receiving, via the communications subsystem, information about a second input received at one of the one or more second devices that is designated as a trusted device, identifying particular third-party content as violating the security policy:

updating the local security policy module, based on the received information; and configuring the electronic device to implement the updated security policy for subsequently received similar third-party content;

wherein the updating of the local security policy module and configuring of the electronic device occurs only when the information is received from a second device that has been assigned group level authorization or designated as a trusted device among the one or more second devices.

12. The method of claim 10, further comprising:
receiving, via the communications subsystem, third-party content that is available for access on the electronic device; and
in response to receiving the third-party content:
initiating a check for whether the user input has been received via the at least one user interface device designating the third-party content as violating a security policy; and
preventing an opening of the third-party content in response to having received the user input designating the third-party content as violating the security policy.

13. The method of claim 12, further comprising:
in response to determining that the third-party content is recognized as violating a security policy as updated by the user input, presenting, via the user interface component, notification that the third-party content is not trusted for access on the electronic device based on the updated security policy prompted by previously received user input.

14. The method of claim 12, further comprising:
enabling entry of an override of the security policy to allow opening of the third-party content; and
in response to receiving, via the user interface device of the electronic device while the electronic device is designated as a trusted electronic device, an override input, presenting the third-party content at the one or more output device.

15. The method of claim 10, further comprising:
monitoring for a local handling of the third-party content, in response to not having received the user input;
identifying if the local handling comprises a second user input from among (i) designating the third-party content as violating the security policy, (ii) deleting the third-party content without opening the communication or a link within the communication, or (iii) moving the third-party content into a junk mail or quarantine mail folder; and
in response to detecting the second user input:
processing the second user input to determine whether to update the security policy module; and
in response to updating the security policy module, communicating the second user input to at least one other second electronic device.

16. The method of claim 10, wherein:
the security policy module comprises an artificial intelligence module trained to recognize third-party content that violates a security policy; and
the method further comprises updating the security policy module by further training the artificial intelligence module to recognize similar third-party content in response to identifying if local handling comprises a user input from among (i) designating the third-party content as violating the security policy, (ii) deleting the third-party content without opening the communication or a link within the communication, or (iii) moving the third-party content into a junk mail or quarantine mail folder.

17. The method of claim 10, further comprising:
receiving, via one of the at least one user interface component, the user input designating the third-party content as violating the security policy; and
communicating the user input via the communications subsystem to the one or more second electronic device to prompt an update of each security policy module of the one or more second electronic device to recognize third-party content, which is subsequently received, based on the user input.

18. The method of claim 17, further comprising:
inferring that the third-party content violates the security policy based on a local handling comprising a user input from among (i) designating the third-party content as violating the security policy, (ii) deleting the third-party content without opening the communication or a link within the communication, or (iii) moving the third-party content into a junk mail or quarantine mail folder; and
in response to inferring a security policy violation based on the local handling:
presenting a notification to confirm an inferred update of security policy; and
updating the security policy module to recognize and implement, based on the user input, security measures against similar third-party content that is subsequently received in response to receiving confirming input via the at least one user input device.

19. A computer program product comprising:
a non-transitory computer readable storage device; and
program code on the computer readable storage device that when executed by a processor associated with an electronic device, the program code enables the electronic device to provide functionality of:
communicatively coupling, via a communications subsystem, the electronic device to at least one third-party content provider via a network;
linking the electronic device to one or more second electronic devices designated as part of a security policy sharing group, each device having a respective security policy module that manages filtering of third-party content, in part based on received user-inputs that indicate when received third-party content violates a security policy of the electronic device or one or more of the second electronic devices;
receiving user inputs via one or more input device of at least one user interface component;
presenting content via one or more output device of the at least one user interface component; and
in response to receiving, via the at least one user interface component, a user input designating a first third-party content as violating a security policy:
identifying whether the electronic device has been assigned group level authorization to make security decisions for security policy sharing group of electronic devices; and
in response to determining that the electronic device has been assigned group level authorization:
updating the security policy module of the electronic device;
configuring the electronic device to implement the updated security policy of the first third-party content; and
transmitting a security policy update to each of the one or more second devices within the security policy sharing group to trigger an update of the respective security policy module to recognize and locally implement security measures against similar third-party content that is subsequently received at a respective one of the one or more second devices, wherein the security policy update is transmitted only if the electronic device has been assigned group level authorization or is designated as a trusted device within the security policy sharing group.

20. The computer program product of claim 19, wherein the program code enables the electronic device to provide functionality of:

identifying, from within the security policy sharing group, at least one trusted device that is designated as having a trusted security expertise level, which indicates that inputs received at the at least one trusted device as related to potential security threats from third party content, can be utilized to trigger updates to the security policy module and respective security policy modules of each device within the security policy sharing group; and in response to receiving, via the communications subsystem, information about a second input received at one of the one or more second devices that is designated as a trusted device, identifying particular third-party content as violating the security policy:

updating the local security policy module, based on the received information; and configuring the electronic device to implement the updated security policy for subsequently received similar third-party content;

wherein the updating of the local security policy module and configuring of the electronic device occurs only when the information is received from a second device that has been assigned group level authorization or designated as a trusted device among the one or more second devices.

* * * * *